(12) United States Patent
Murata (10) Patent No.: US 10,093,183 B2
(45) Date of Patent: Oct. 9, 2018

(54) ELECTRIC VEHICLE

(71) Applicant: TOYOTA JIDOSHA KABUSHIKI KAISHA, Toyota-shi, Aichi (JP)

(72) Inventor: Shigeaki Murata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 201 days.

(21) Appl. No.: 15/128,173

(22) PCT Filed: Jan. 26, 2015

(86) PCT No.: PCT/JP2015/052011
§ 371 (c)(1),
(2) Date: Sep. 22, 2016

(87) PCT Pub. No.: WO2015/146267
PCT Pub. Date: Oct. 1, 2015

(65) Prior Publication Data
US 2017/0096067 A1    Apr. 6, 2017

(30) Foreign Application Priority Data
Mar. 24, 2014    (JP) .................................. 2014-060767

(51) Int. Cl.
*B60L 3/00*     (2006.01)
*B60K 1/04*     (2006.01)
(Continued)

(52) U.S. Cl.
CPC ........ *B60L 3/0007* (2013.01); *B60H 1/00392* (2013.01); *B60H 1/3223* (2013.01);
(Continued)

(58) Field of Classification Search
CPC ...... B60L 3/0007; B60L 3/0053; B60L 11/18; B60L 11/1892; B60L 11/1896;
(Continued)

(56) References Cited

U.S. PATENT DOCUMENTS

| 5,704,644 | A  | * | 1/1998  | Jaggi ........................ B60K 1/00 180/311 |
| 9,627,721 | B2 | * | 4/2017  | Kosaki .................. H02J 7/0068 |
| 9,647,280 | B2 | * | 5/2017  | Matsumoto ....... H01M 8/04201 |
| 9,669,729 | B2 | * | 6/2017  | Ohashi ................ B60L 11/1883 |
| 2002/0187382 | A1 | * | 12/2002 | Nishiumi ................. B60K 1/04 429/434 |

(Continued)

FOREIGN PATENT DOCUMENTS

CN     102328571 A    1/2012
CN     103101425 A    5/2013
(Continued)

Primary Examiner — Erez Gurari
(74) Attorney, Agent, or Firm — Hunton Andrews Kurth LLP (57) ABSTRACT

In order to limit entry of a fuel cell stack into a passenger compartment by a simple structure, the fuel cell stack is accommodated in an accommodating compartment formed at a rear of a passenger compartment. A force receiving member is arranged forward with respect to the fuel cell stack and below the fuel cell stack so that rearward force acts on the force receiving member at the time of vehicle collision. When the rearward force acting on the force receiving member due to vehicle collision is larger than a predetermined upper limit value, the rearward force is converted into upward force, and the upward force is transmitted to a forward bottom surface of the fuel cell stack, whereby a forward end part of the fuel cell stack is lifted up with respect to a rearward end part of the fuel cell stack upon vehicle collision.

11 Claims, 10 Drawing Sheets

(51) Int. Cl.
*B60K 1/00* (2006.01)
*H01M 8/04029* (2016.01)
*B60K 8/00* (2006.01)
*B60L 11/18* (2006.01)
*B60H 1/00* (2006.01)
*B60H 1/32* (2006.01)
*B62D 21/15* (2006.01)
*H01M 8/04111* (2016.01)

(52) U.S. Cl.
CPC ............... *B60K 1/00* (2013.01); *B60K 1/04* (2013.01); *B60K 8/00* (2013.01); *B60L 3/0053* (2013.01); *B60L 11/18* (2013.01); *B60L 11/1892* (2013.01); *B60L 11/1896* (2013.01); *B62D 21/152* (2013.01); *H01M 8/04029* (2013.01); *H01M 8/04111* (2013.01); *B60K 2001/0411* (2013.01); *B60Y 2200/91* (2013.01); *B60Y 2306/01* (2013.01); *H01M 2250/20* (2013.01); *Y02T 90/32* (2013.01)

(58) Field of Classification Search
CPC .... B60H 1/00392; B60H 1/3223; B60K 1/00; B60K 1/04; B62D 21/152
See application file for complete search history.

(56) References Cited

U.S. PATENT DOCUMENTS

| | | | |
|---|---|---|---|
| 2007/0215397 A1* | 9/2007 | Suzuki | B60K 1/00 180/65.31 |
| 2011/0300426 A1* | 12/2011 | Iwasa | B60K 1/04 429/99 |
| 2011/0315464 A1 | 12/2011 | Yokoyama et al. | |
| 2013/0119704 A1 | 5/2013 | Amano et al. | |
| 2014/0367182 A1* | 12/2014 | Yoshinaga | B60L 11/1898 180/68.4 |
| 2015/0249240 A1* | 9/2015 | Hihara | B60K 1/04 180/68.5 |
| 2015/0251560 A1* | 9/2015 | Ishikawa | B62D 21/15 180/232 |
| 2016/0297290 A1* | 10/2016 | Murata | B60K 1/04 |
| 2017/0101031 A1* | 4/2017 | Ohashi | H01M 8/04201 |

FOREIGN PATENT DOCUMENTS

| | | |
|---|---|---|
| CN | 103101426 A | 5/2013 |
| JP | 2002-367637 A | 12/2002 |
| JP | 2007-245954 A | 9/2007 |
| JP | 2011-162108 A | 8/2011 |

* cited by examiner

FIG. 15

ELECTRIC VEHICLE

CROSS-REFERENCE TO RELATED APPLICATIONS

This is a national phase application based on the PCT International Patent Application No. PCT/JP2015/052011 filed Jan. 26, 2015, claiming priority to Japanese Patent Application No. 2014-060767 filed Mar. 24, 2014, the entire contents of both of which are incorporated herein by reference.

TECHNICAL FIELD

The present invention relates to an electric vehicle.

BACKGROUND ART

An electric vehicle is known in the art, which accommodates an electric motor for driving the vehicle in an accommodating compartment formed in the vehicle forward with respect to a passenger compartment and accommodates a fuel cell stack above the electric motor, wherein the fuel cell stack has a generally rectangular shape and is flat in configuration with a height smaller than a length and width, and the fuel cell stack is arranged in the accommodating compartment so that a length directional axis of the fuel cell stack is oriented in a vehicle width direction and a width directional axis of the fuel cell stack is oriented in a vehicle length direction (see PLT 1).

CITATION LIST

Patent Literature

PLT 1. Japanese Patent Publication No, 2002-367637A

SUMMARY OF INVENTION

Technical Problem

However, if force directing inward in the vehicle length direction acts on the fuel cell stack due to collision of the electric vehicle at, for example, its front end, the fuel cell stack is liable to move toward the passenger compartment and to enter the passenger compartment.

Solution to Problem

According to the present invention, there is provided an electric vehicle accommodating a fuel cell stack in an accommodating compartment formed at an outside of a passenger compartment in a vehicle length direction, wherein the fuel cell stack has a generally rectangular shape and is flat in configuration with a height smaller than a length and width, wherein the fuel cell stack is arranged in the accommodating compartment so that the two largest surfaces among surfaces of the fuel cell stack form a top surface and bottom surface of the fuel cell stack, wherein a force receiving member is arranged at the outside in the vehicle length direction with respect to the fuel cell stack and below the fuel cell stack so that force toward the inside in the vehicle length direction acts on the force receiving member at the time of vehicle collision, and wherein the electric vehicle is further provided with a force transmission mechanism which, when force acting on the force receiving member directing inward in the vehicle length direction due to vehicle collision is larger than a predetermined upper limit value, converts the inward force to upward force and transmits the upward force to the bottom surface of the fuel cell stack at the outside in the vehicle length direction, whereby, at the time of vehicle collision, an end part of the fuel cell stack at the outside in the vehicle length direction is lifted up with respect to an end part of the fuel cell stack at the inside in the vehicle length direction.

Advantageous Effects of invention

Using a simple structure, it is possible to limit a fuel cell stack from entering a passenger compartment.

DESCRIPTION OF EMBODIMENTS

Figure 1:
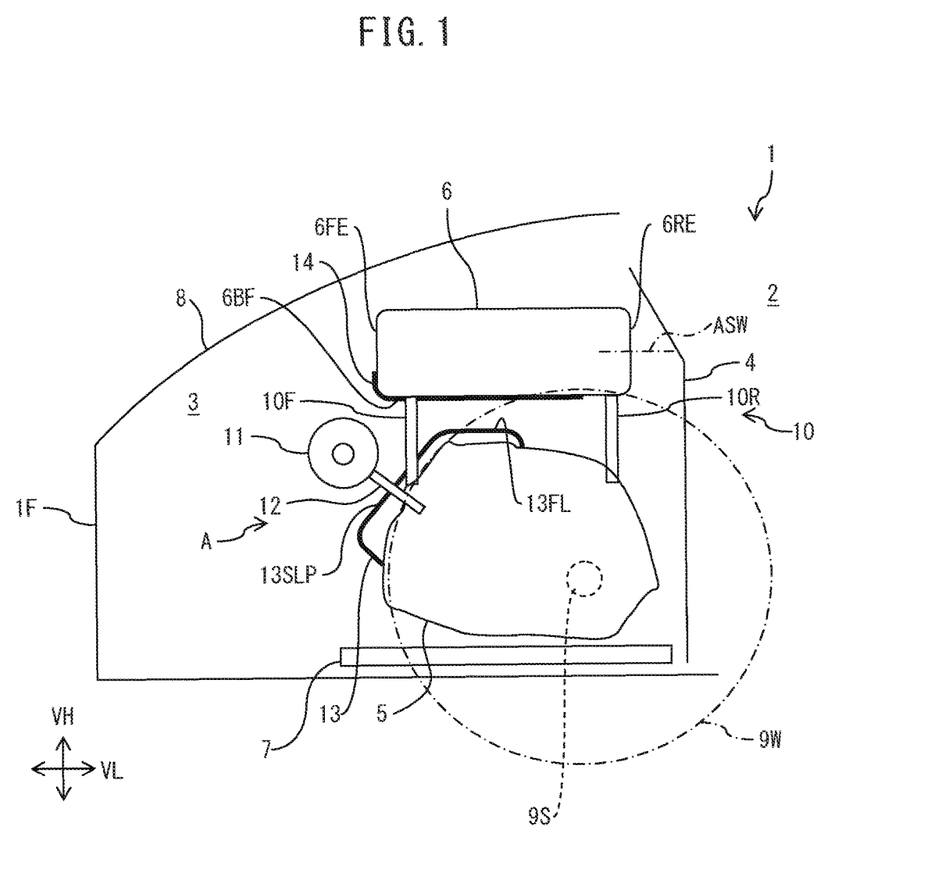
FIG. 1 is a partial vertical cross-sectional view of an electric vehicle.
Figure 2:
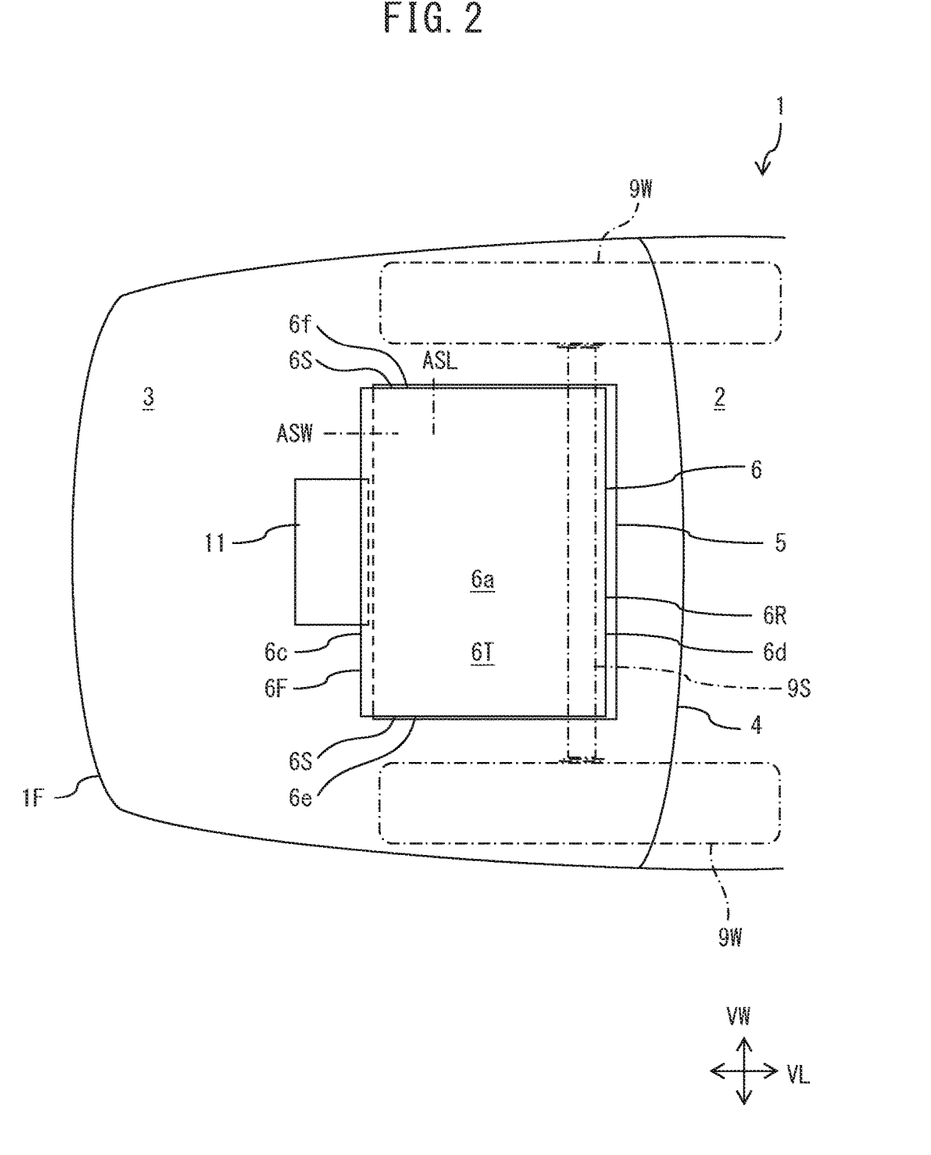
FIG. 2 is a partial plan view of an electric vehicle.
Figure 3:
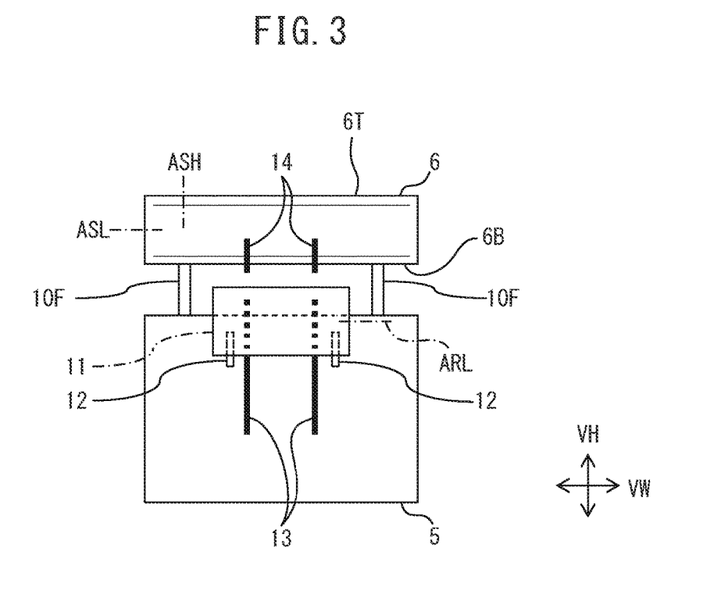
FIG. 3 is a schematic front view of an electric motor, fuel cell stack, and compressor.

Referring to FIG. 1 to FIG. 3, an electric vehicle 1 is provided with a passenger compartment 2 and an accommodating compartment 3 formed at an outside of the passenger compartment. 2 in the vehicle length direction, that is, at a front side. In the embodiment shown in FIG. 1, the accommodating compartment 3 is separated from the passenger compartment 2 by a dashboard 4. At this accommodating compartment 3, in particular a bottom part of the accommodating compartment 3, an electric motor 5 housed in a casing and for driving the vehicle is accommodated and fastened. Further, a fuel cell stack 6 is accommodated inside the accommodating compartment 3 above the electric motor 5. Inc fuel cell stack 6 generates electrical energy. This electrical energy is supplied to the electric motor 5. As a result, the electric vehicle 1 is driven. Further, at the bottom part of the accommodating compartment 3, a suspension member 7 is accommodated.

Note that, in FIG. 1 and FIG. 2, 1F designates an outside end, that is, a front end, of the vehicle while 8 designates a hood. Therefore, the accommodating compartment 3 is defined by the vehicle front end 1F, dashboard 4, and hood 8. Further, in FIG. 1 and FIG. 2, 9S designates a drive shaft, while 9W designates vehicle wheels. Furthermore, in FIG. 1 to FIG. 3, VL designates a vehicle Length direction, VW a vehicle width direction, and VH a vehicle height direction. Here, the vehicle length direction VL and vehicle width direction VW are horizontal directions, while the vehicle height direction VH is the vertical direction.

Figure 4:
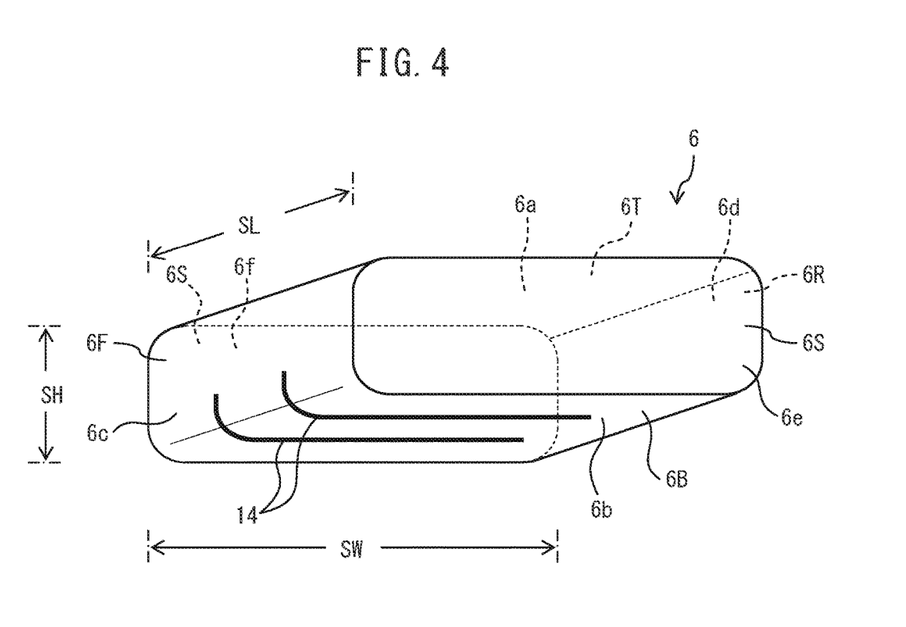
FIG. 4 is a schematic perspective view of a fuel cell stack.

The fuel cell stack 6 is formed from a stack comprised of a plurality of unit fuel cells stacked together and a casing accommodating this stack. As shown in FIG. 4, the fuel cell stack 6 has a generally rectangular shape. Further, the height SH of the fuel cell stack 6 is smaller than the length SL and width SW of the fuel cell stack 6. Therefore, the fuel cell stack 6 has a flat shape. That is, the fuel cell stack 6 is provided with a first surface 6a and a second surface 6b extending mutually substantially in parallel, a third surface 6c and fourth surface 6d extending mutually substantially in parallel, and a fifth surface 6e and sixth surface 6f extending mutually substantially in parallel. Here, the first surface 6a and the second surface 6b are defined by the length SL and width SW, the third surface 6c and fourth surface 6d. are defined by the length SL and height SH of the fuel cell stack 6, and the fifth surface 6e and sixth surface 6f are defined by the width SW and height SH of the fuel cell stack 6. The first surface 6a and the second surface 6b are the largest in the surfaces of the fuel cell stack 6, while the third surface 6c and fourth surface 6d are larger than the fifth surface 6e and sixth surface 6f. Note that, the surfaces 6a, 6b, 6c, 6d, 6e, and 6f of the fuel cell stack 6 are not necessarily flat and may include some convexes and concaves. Further, the unit fuel cells are stacked along a length directional axis ASL (FIGS. 2 and 3) of the fuel cell stack 6. In another embodiment, the unit fuel cells are stacked along a width directional axis ASW (FIGS. 2 and 3) of the fuel cell stack 6.

In the embodiment shown from FIG. 1 to FIG. 3, the fuel cell stack 6 is arranged in the accommodating compartment 3 so that the length directional axis ASL of the fuel cell stack 6 is oriented, in the vehicle width direction VW and the width directional axis ASW of the fuel cell stack 6 is oriented in the vehicle length direction VL. In this case, the largest first surface 6a and second surface 6b of the fuel cell stack 6 respectively form a top surface 6T and bottom surface 6B of the fuel cell stack 6. Further, the third surfaces 6c, 6d of the fuel cell stack 6 respectively form a front surface 6F and rear surface 6R of the fuel cell stack 6, while the fifth surface 6e and sixth surface 6f of the fuel cell stack 6 respectively form side surfaces 6S, 6S of the fuel cell stack 6. Further, in this case, the height directional axis ASH of the fuel cell stack 6 is oriented in the vehicle height direction VH.

The fuel cell stack 6 is supported through a stack support 10 on for example the electric motor 5. The stack support 10 includes for example a pair of front side stack supports 10F extending from a vehicle front end part 6FE of the fuel cell stack 6 to the electric motor 5 and for example a pair of rear side stack supports 10R extending from a vehicle rear end part 6RE of the fuel cell stack 6 to the electric motor 5. In this case, a connecting strength of the front side stack supports 10F and the fuel cell stack 6 is smaller than a connecting strength of the rear side stack supports 10R and the fuel cell stack 6. In other words, the front side stack supports 10F are more easily detached from the fuel cell stack 6 than the rear side stack supports 10R. Note that, in another embodiment, the fuel cell stack 6 is supported on the suspension member 7 (FIG. 1).

In the embodiment shown from FIG. 1 to FIG. 3, furthermore, a force receiving member 11 is arranged at the vehicle front side with respect to the fuel cell stack 6 and electric motor 5 and suspension member 7 and below the fuel cell stack 6. The force receiving member 11 is substantially cylindrical in shape. As shown in FIG. 3, it is arranged so that a length directional axis ARL of the force receiving member 11 is oriented in the vehicle width direction VW.

In the embodiment shown from FIG. 1 to FIG. 3, the force receiving member 11 is comprised of an auxiliary of the electric vehicle 1. This auxiliary is comprised of at least one of a compressor for supplying air to the fuel cell stack 6, a cooling water pump for supplying cooling water to the fuel cell stack 6, and a compressor for pumping coolant of an air conditioner of the vehicle 1. Further, the force receiving member 11 is held at the electric motor 5 through for example a pair of force receiving member supports 12. In another embodiment, the force receiving member 11 is held at the suspension member 7 (FIG. 1).

In this case, the force receiving member 11 is arranged at the vehicle front side with respect to the fuel cell stack 6 and electric motor 5 and suspension member 7 and thus, when the electric vehicle 1 collides at the front end 1E, a force in the vehicle length direction VI, that is, a backward force, acts on the force receiving member 11.

Furthermore, the electric vehicle 1 is further provided with a force transmission mechanism A which, when force acting on the force receiving member 11 directing inward in the vehicle length direction VL due to vehicle collision is larger than a predetermined upper limit value, converts the inward force to upward force, and transmits this upward force to the front side part of the bottom surface of the fuel cell stack 6, that is, the front side bottom surface 6BF.

In the embodiment shown from FIG. 1 to FIG. 3, the force transmission mechanism A is provided with a guide member 13 attached to the front side of the electric motor 5. The guide member 13 is comprised of for example a pair of guide rails. Further, the guide member 13 includes a sloping part 13SLP sloped upward as it extends inward in the vehicle length direction VL, that is, rearward, and a flat part 13Ft extending in the vehicle length direction VL at the inner side in the vehicle length direction VL, that is, at the rear side with respect to the sloping part 13SLP. In another embodiment, the guide member 13 is attached to a front side of the suspension member 7 (FIG. 1).

Furthermore, referring to FIG. 1 to FIG. 4, a sliding part 14 is provided at the bottom surface 6B and front surface 6F of the fuel cell stack 6. The sliding part 14 extends at the bottom surface 6B of the fuel cell stack 6 in the width direction of the fuel cell stack 6 or vehicle length direction VL. The sliding part 14 is comprised of for example a pair of projecting parts formed integrally with the casing of the fuel cell stack 6. In this case, these projecting parts act also as ribs for increasing a rigidity of the fuel cell stack 6. In another embodiment, the sliding part 14 is comprised of a rail separately formed from the fuel cell stack 6 and attached to the fuel cell stack 6.

Now then, as explained above, if the electric vehicle 1 collides at its front end, the force directing inward in the vehicle length direction VL acts on the force receiving member 11. In other words, force directing inward in the vehicle length direction VL does not directly act on the fuel cell stack 6. As a result, the fuel cell stack 6 is limited from entering into the passenger compartment 2.

Figure 5:
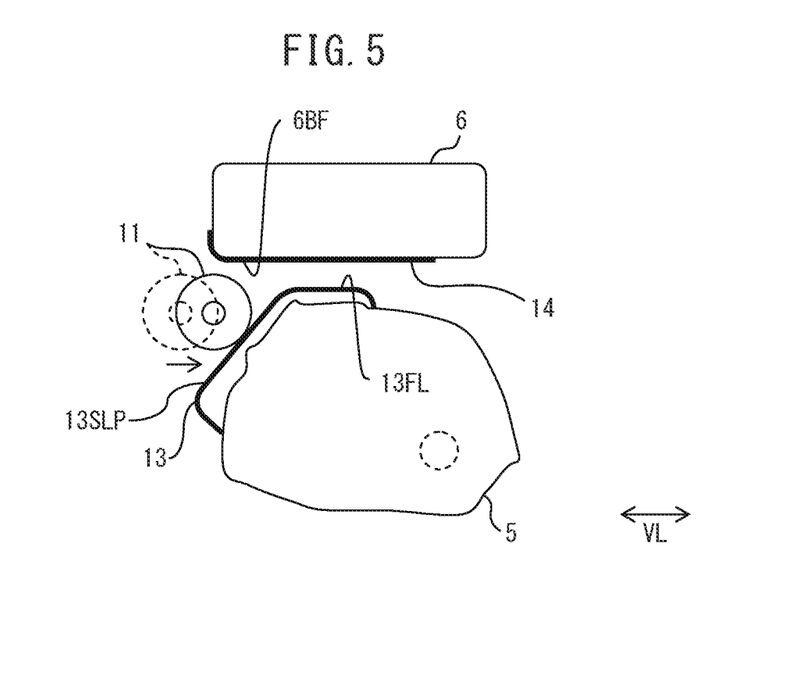
FIG. 5 is a schematic view explaining an action of a force transmission mechanism.

In the embodiment shown from FIG. 1 to FIG. 4, when a magnitude of the force directing inward in the vehicle length direction VL acting on the force receiving member 11 due to a vehicle collision is larger than the above-mentioned upper limit value, the force receiving member 11 is detached from the force receiving member support 12. As a result, as shown in FIG. 5, the force receiving member 11 moves inward in the vehicle length direction VL and abuts against the sloping part 13SLP of the guide member 13 attached to the electric motor 5.

Next, the force receiving member 11 is guided by the sloping part 13SLP of the guide member 13, that is, slides on the sloping part 13SLP, and moves inward in the vehicle length direction VL while moving upward. Next, the force receiving member 11 abuts against the front side bottom surface 6BF of the fuel cell stack 6, in particular the sliding part 14. As a result, an upward force acts on the front side bottom surface 6BF of the fuel cell stack 6. In other words, part of the force directing inward in the vehicle length direction VL acting on the force receiving member 11 is converted to the upward force, and this upward force is transmitted to the front side bottom surface 6BF of the fuel cell stack 6.

Figure 6:
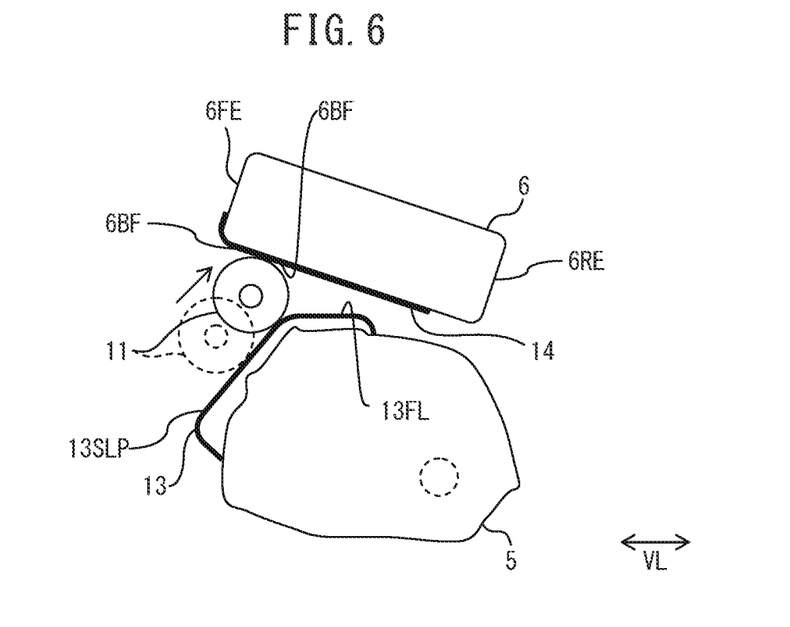
FIG. 6 is a schematic view explaining an action of a force transmission mechanism.

Here, as explained above, the front side stack supports 10F are more easily detached from the fuel cell stack 6 compared with the rear side stack supports 10R. As a result, as shown in FIG. 6, the front side end part 6FE of the fuel cell stack 6 is lifted up with respect to the rear side end part 6RE of the fuel cell stack 6. That is, the fuel cell stack 6 is made to stand up.

When the fuel cell stack 6 is made to stand up in this way, the force receiving member 11 can move further inward in the vehicle length direction VL and upward. Next, the force receiving member 11 slides on the guide member 13 and sliding part 14 while moving further inward in the vehicle length direction VL and upward. As a result, force directing inward in the vehicle length direction VL and upward force are further transmitted to the fuel cell stack 6, and the fuel cell stack 6 is further made to stand up.

Next, when the force receiving member 11 reaches the flat part 13FL of the guide member 13, the force receiving member 11 moves further on the flat part 13FL inward in the vehicle length direction VL. Therefore, force directing inward, in the vehicle length direction, that is, rearward force, is transmitted to the fuel cell stack 6. As a result, the fuel cell stack 6 moves further rearward in a standing up state.

In this way, since the force receiving member 11 makes the fuel cell stack 6 stand up, the force directing inward in the vehicle length direction VL at the time of vehicle collision is absorbed well. Further, when the fuel cell stack 6 is made to stand up, the broad top surface 6T of the fuel cell stack 6 faces the passenger compartment 2. Therefore, compared with when the fuel cell stack 6 is not made to stand up, that is, when the narrow rear surface 6F of the fuel cell stack 6 faces the passenger compartment 2, it becomes difficult for the fuel cell stack 6 to enter inside the passenger compartment 2. That is, a simple structure is used to limit the fuel cell stack 6 from entering inside the passenger compartment 2.

Note that, how far the force receiving member 11 moves inward in the vehicle length direction VL changes depending on the magnitude of the force directing inward in the vehicle length direction VL acting on the force receiving member 11 due to vehicle collision.

Further, the force receiving member 11 has a rigidity of an extent where it will not deform even if a force directing inward in the vehicle length direction VL larger than the above-mentioned upper limit value due to a vehicle collision acts thereon, while the fuel cell stack 6 or sliding part 14 has a rigidity of an extent where it will not deform even if a transmitted upward force acts thereon. Note that, in the embodiment shown in FIG. 1 to FIG. 4, the sliding part 14 is formed from projecting parts or ribs and, thus, it can be said that rib portions 14 are formed on the front side bottom surface 6BF of the fuel cell stack 6 against which the force receiving member 11 abuts.

Figure 7:
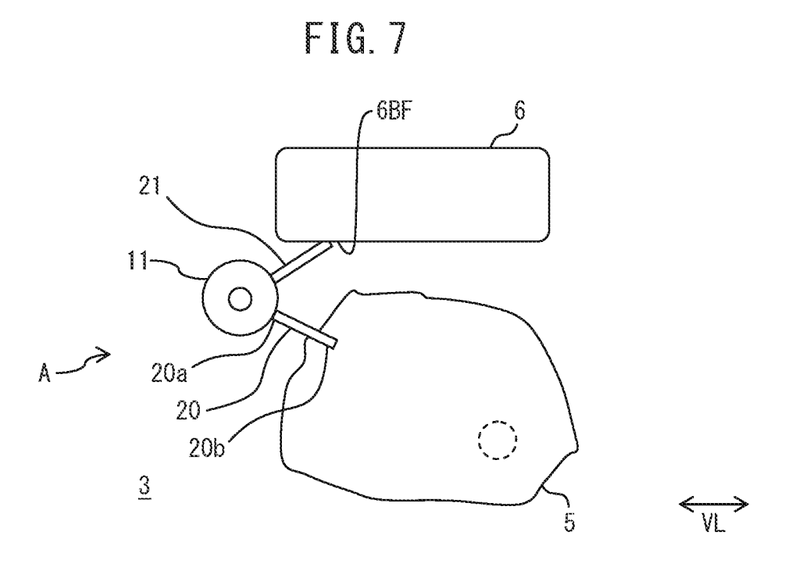
FIG. 7 is a view showing another embodiment according to the present invention.
Figure 8:
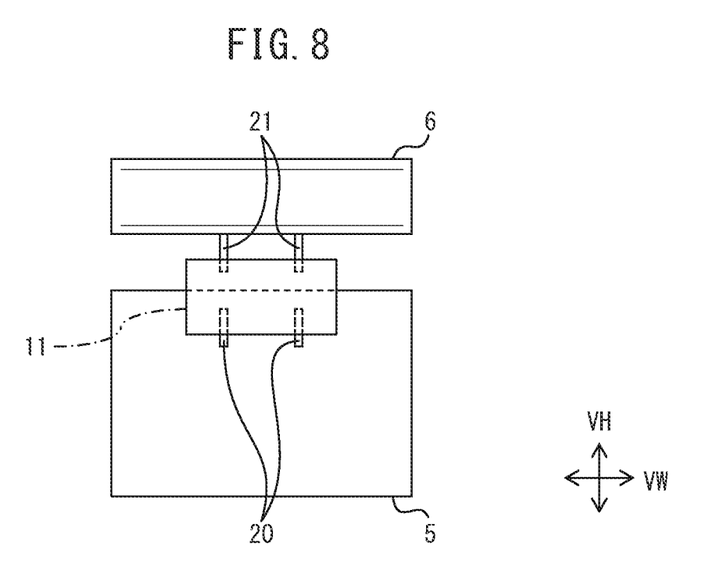
FIG. 8 is a view showing another embodiment according to the present invention.

FIG. 7 and FIG. 8 show another embodiment according to the present invention.

In the embodiment shown in FIG. 7 and FIG. 8, the force transmission mechanism A is provided with for example a pair of force receiving member supports 20 which support the force receiving member 11. In this case, one end 20a of the force receiving member support 20 is connected to the force receiving member 11, while the other end 20b of the force receiving member support 20 is connected to the electric motor 5. That is, the force receiving member 11 is supported by the electric motor 5 through the force receiving member support 20. Further, the force receiving member support 20 is sloped downward as it extends rearward from the force receiving member 11 to the electric motor 5. In another embodiment, the other end 20b of the force receiving member support 20 is connected to the suspension member 7.

The force transmission mechanism A is further provided with a force transmitting member 21 extending between the force receiving member 11 and the front side bottom surface 6BF of the fuel cell stack 6. In the embodiment shown in FIG. 7 and FIG. 8, the force transmitting member 21 is comprised of for example a pair of rod shaped members. The force transmitting member 21 slopes upward as it extends rearward from the force receiving member 11 to the fuel cell stack 6. Note that, in FIG. 7 and FIG. 8, illustration of the stack supports 10 is omitted.

Figure 9:
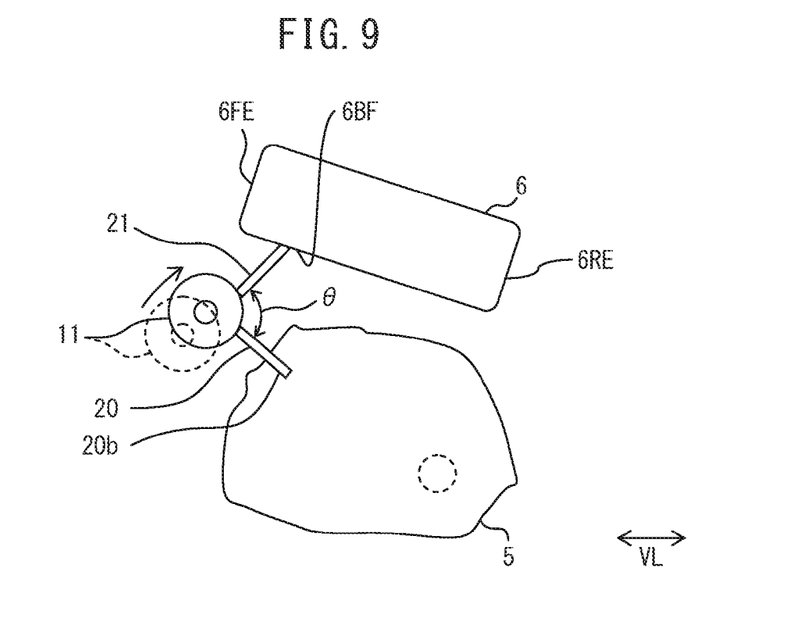
FIG. 9 is a schematic view explaining an action. of the force transmission mechanism of the embodiment of FIG. 7 and FIG. 8.

When a rearward force larger than the upper limit value acts on the force receiving member 11 due to a vehicle collision, the force receiving member support 20 bends or deforms at the one end 20a and other end 20b. As a result, as shown in FIG. 9, the force receiving member 11 rotates rearward about the other end 20b of the force receiving member support 20. Therefore, the force receiving member 11 moves rearward while moving upward.

As a result, the upward force is transmitted to the front side bottom surface 6BF of the fuel cell stack 6 through the force transmitting member 21. In this case, the force transmitting member 21 is bent at its two ends. Therefore, the front side end part 6FE of the fuel cell stack 6 is lifted up with respect to the rear side end part 6RE of the fuel cell stack 6. That is, the fuel cell stack 6 is made to stand up.

Here, as shown in FIG. 9, an angle θ is formed between the force receiving member support 20 and the force transmitting member 21 in the vertical plane. Thus, in the embodiment shown in FIG. 7 and FIG. 8, it is also possible to consider that, when a rearward force larger than the upper limit value acts on the force receiving member 11 due to a vehicle collision, the angle θ is made larger and thereby an upward force is transmitted to the fuel cell stack 6.

Figure 10:
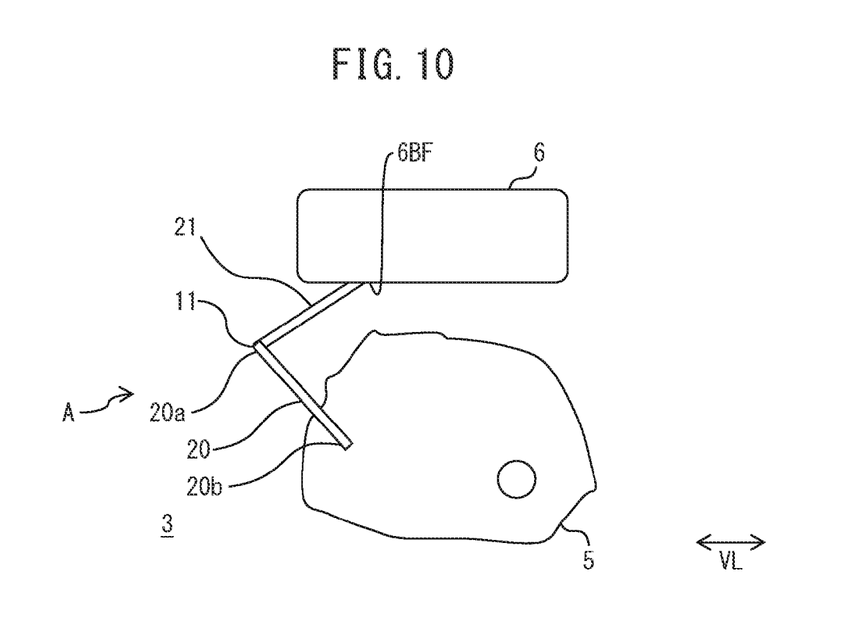
FIG. 10 is a view showing still another embodiment according to the present invention.

FIG. 10 shows still another embodiment according to the present invention.

The embodiment shown in FIG. 10 differs in configuration from the embodiment shown in FIG. 7 and FIG. 8 in the point that the force receiving member 11 is comprised of one end 20a of the force receiving member support 20. In other words, the force receiving member 11 and the force receiving member support 20 are integrally formed.

Figure 11:
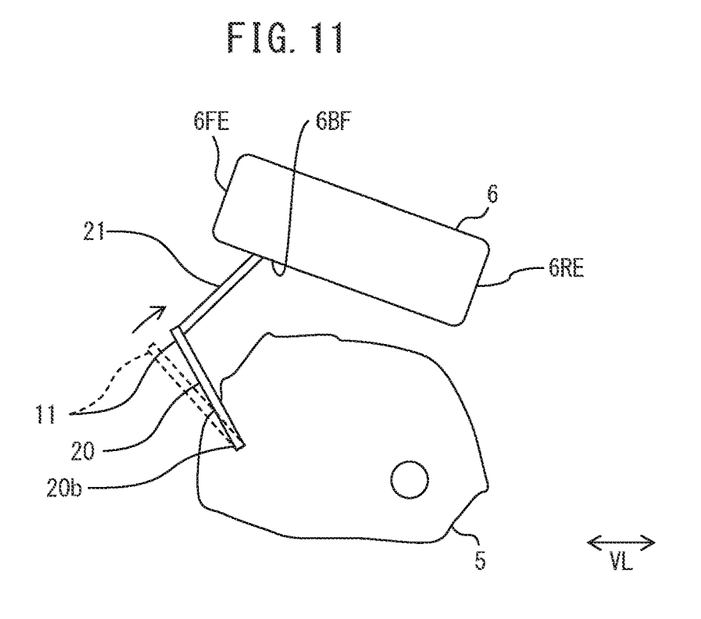
FIG. 11 is a schematic view explaining an action of the force transmission mechanism of the embodiment of FIG. 10.

When a rearward force larger than the upper limit value acts on the force receiving member 11 due to a vehicle collision, as shown in FIG. 11, the force receiving member 11 rotates rearward about the other end 20b of the force receiving member support 20. Therefore, the force receiving member 11 moves rearward while moving upward, and the upward force is transmitted to the front side bottom surface 6BF of the fuel cell stack 6 through the force transmitting member 21. In this way, the front side end part 6FE of the fuel cell stack 6 is lifted up with respect to the rear side end part 6RE of the fuel cell stack 6.

Figure 12:
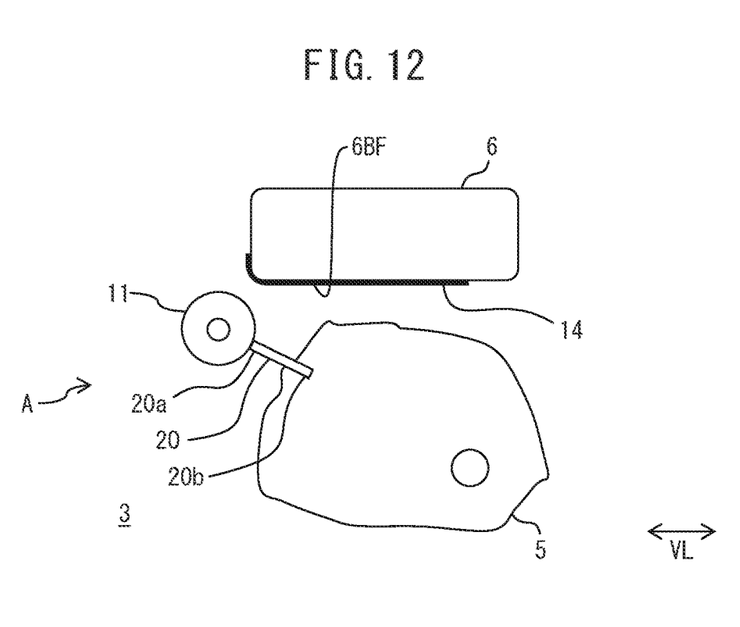
FIG. 12 is a view showing still another embodiment according to the present invention.

FIG. 12 shows still another embodiment according to the present invention.

The embodiment shown in FIG. 12 differs in configuration from the embodiment shown in FIG. 7 and FIG. 8 on the point that the force transmitting member 21 is not provided and that the fuel cell stack 6 is provided with a sliding part 14 as shown in FIG. 1 to FIG. 4.

Figure 13:
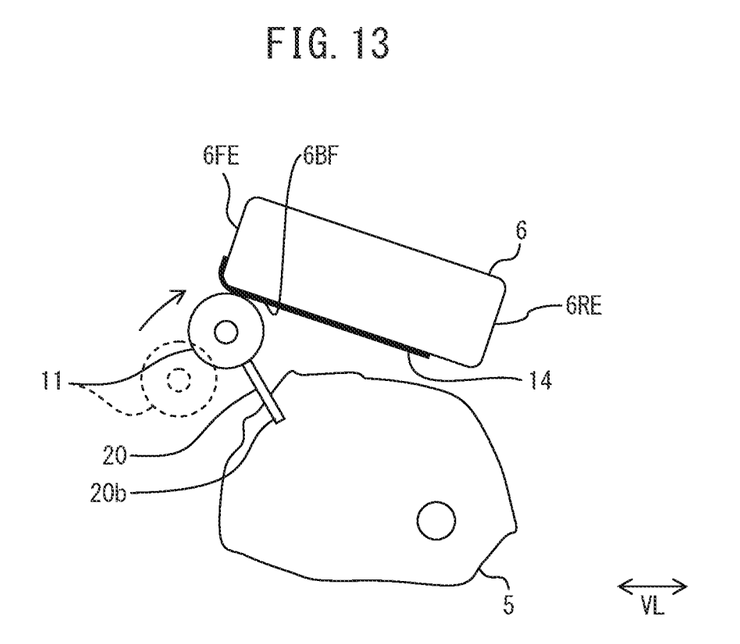
FIG. 13 is a schematic view explaining an action of the force transmission mechanism of the embodiment of FIG. 12.

When a rearward force larger than the upper limit value acts on the force receiving member 11 due to a vehicle collision, the force receiving member support 20 bends at one end 20a and the other end 20b. As a result, as shown in FIG. 13, the force receiving' member 11 rotates rearward about the other end 20b of the force receiving member support 20. Therefore, the force receiving member 11 moves rearward while moving upward.

Next, the force receiving member 11 abuts against the front side bottom surface 6BF of the fuel cell stack 6. As a result, an upward force acts on the front side bottom surface 6BF of the fuel cell stack 6, and therefore the upward force is transmitted to the front side bottom surface 6BF of the fuel cell stack 6. Next, the force receiving member 11 slides on the sliding part 14 while further moving inward in the vehicle length direction VL and upward. As a result, the fuel cell stack 6 is made to stand up.

In the embodiments explained up to here, the accommodating compartment 3 is formed at the front side of the passenger compartment 2. In another embodiment, the accommodating compartment 3 is formed at the rear side of the passenger compartment 2, and the fuel cell stack 6 is accommodated inside this accommodating compartment 3. In this case, when forward force acting on the force receiving member 11 due to a vehicle collision is larger than the upper limit value, the force transmission mechanism A converts the forward force to upward force and transmits the upward force to the rear side bottom surface of the fuel cell stack 6. As a result, at the time of vehicle collision, the rear side end part 6RE of the fuel cell stack 6 is lifted up with respect to the front side end part 6FE of the fuel cell stack 6.

Figure 14:
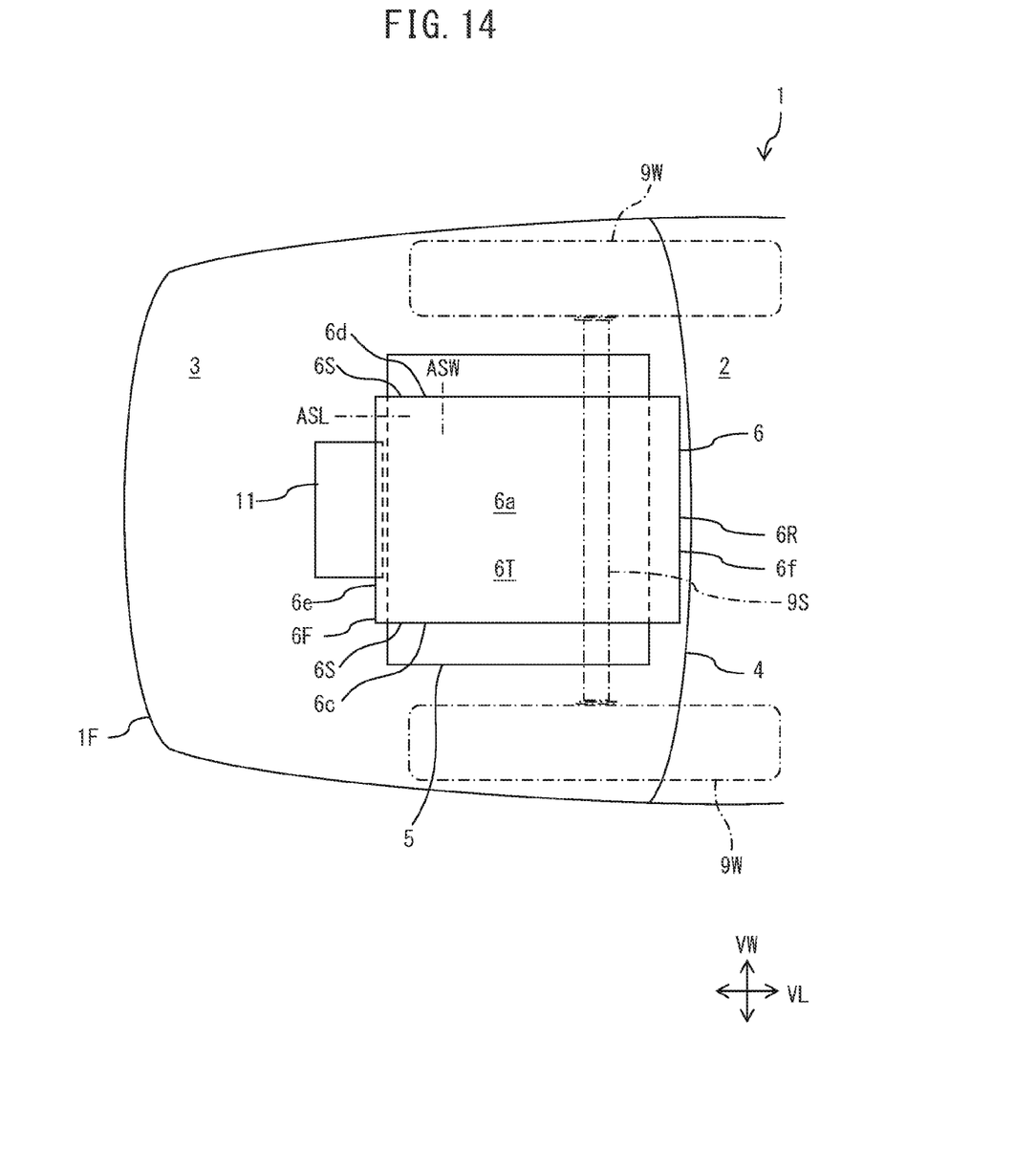
FIG. 14 is a partial cross-sectional view showing still another embodiment according to the present invention.

In the embodiments explained up to here, the fuel cell stack 6 is arranged inside the accommodating compartment 3 so that the length directional axis ASL of the fuel cell stack 6 is oriented in the vehicle width direction VW and the width directional axis ASW of the fuel cell stack 6 is oriented in the vehicle length direction VI. In an embodiment shown in FIG. 14, the fuel cell stack 6 is arranged inside the accommodating compartment 3 so that the length directional axis ASL of the fuel cell stack 6 is oriented in the vehicle length direction VL and the width directional axis AS of the fuel cell stack 6 is oriented in the vehicle width direction VW. In this case, the fifth surface 6e and sixth surface 6f of the fuel cell stack 6 respectively form the front surface 6F and rear surface 6R of the fuel cell stack 6, while the third surface 6c and fourth surface 6d of the fuel cell stack 6 respectively form the side surfaces 6S, 6S of the fuel cell stack 6. In still another embodiment, the fuel cell stack 6 is arranged so that, in a plan view, the length directional axis ASL and width directional axis ASL of the fuel cell stack 6 are slanted with respect to the vehicle length direction VL and vehicle width direction VW.

Figure 15:
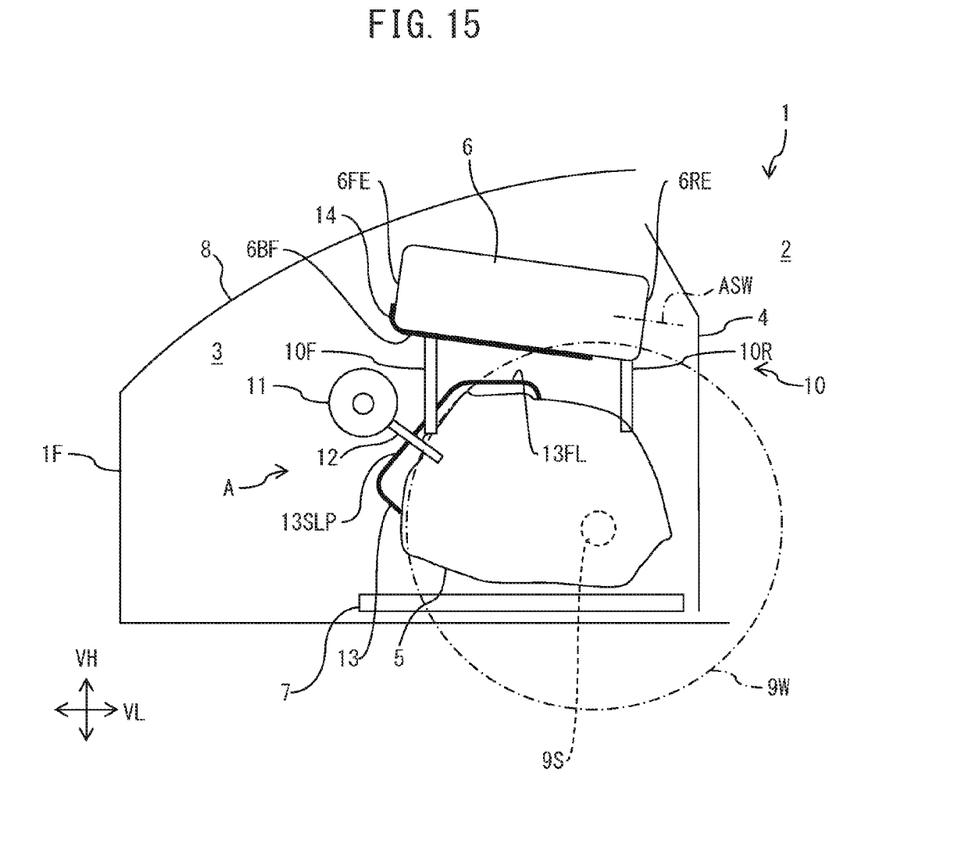
FIG. 15 is a partial vertical cross-sectional view showing still another embodiment according to the present invention.

Further, in the embodiments explained above, the fuel cell stack 6 is arranged so that the length directional axis ASL or width directional axis ASL of the fuel cell stack 6 is oriented in the vehicle length direction VL. That is, the fuel cell stack 6 is arranged so that the end part 6FE of the fuel cell stack 6 at the outside in the vehicle length direction and the end part 6FR at the inside in the vehicle length direction are in substantially the same height positions. In an embodiment shown in FIG. 15, the fuel cell stack 6 is arranged so that the length directional axis ASL or width directional axis ASL of the fuel cell stack 6 is sloped upward with respect to the vehicle length direction VL as it extends outward in the vehicle length direction. That is, the fuel cell stack 6 is arranged so that the outside end 6FE of the fuel cell stack 6 in the vehicle length direction is in the higher position than the inside end 6FR in the vehicle length direction. This ensures standing up of the fuel cell stack 6 at the time of vehicle collision.

If expressing the embodiments explained up to here inclusively, the fuel cell stack 6 is arranged inside the accommodating compartment 3 so that the largest two surfaces 6a, 6b among the surfaces of the fuel cell stack 6 form the top surface 61 and bottom surface 6B of the fuel cell stack 6.

The present application claims the benefit of Japanese Patent Application No. 2014-060767, the entire disclosure of which is incorporated herein by reference.

REFERENCE SIGNS LIST 1. electric vehicle
2. passenger compartment
3. accommodating compartment
5. electric motor
6. fuel cell stack
7. suspension member
11. force receiving member
13. guide member

The invention claimed is:

1. An electric vehicle accommodating a fuel cell stack in an accommodating compartment formed at an outside of a passenger compartment in a vehicle length direction, wherein the fuel cell stack has a generally rectangular shape and is flat in configuration with a height smaller than a length and width, wherein the fuel cell stack is arranged in the accommodating compartment so that the two largest surfaces among surfaces of the fuel cell stack form a top surface and bottom surface of the fuel cell stack, wherein a force receiving member is arranged at the outside in the vehicle length direction with respect to the fuel cell stack and below the fuel cell stack so that force toward the inside in the vehicle length direction acts on the force receiving member at the time of vehicle collision, and wherein the electric vehicle is further provided with a force transmission mechanism which, when force acting on the force receiving member directing inward in the vehicle length direction due to vehicle collision is larger than a predetermined upper limit value, converts the inward force to upward force and transmits the upward force to the bottom surface of the fuel cell stack at the outside in the vehicle length direction, whereby, at the time of vehicle collision, an end part of the fuel cell stack at the outside in the vehicle length direction is lifted up with respect to an end part of the fuel cell stack at the inside in the vehicle length direction.

2. The electric vehicle according to claim 1, wherein an electric motor for driving the vehicle or suspension member is accommodated below the fuel cell stack in the accommodating compartment, wherein the force receiving member is arranged at the outside in the vehicle length direction with respect to the electric motor or suspension member, wherein the force transmission mechanism is provided with a guide member attached to the electric motor or suspension member, wherein the guide member is sloped upward as it extends inward in the vehicle length direction, and wherein, when force directing inward in the vehicle length direction which is larger than the upper limit value acts on the force receiving member, the force receiving member is guided by the guide member while moving upward to abut against the bottom surface of the fuel cell stack at the outside in the vehicle length direction, whereby the upward force is transmitted to the fuel cell stack.

3. The electric vehicle according to claim 1, wherein an electric motor for driving the vehicle or suspension member is accommodated below the fuel cell stack in the accommodating compartment, wherein the force receiving member is arranged at the outside in the vehicle length direction with respect to the electric motor or suspension member, wherein the force transmission mechanism is provided with a force receiving member support which supports the force receiving member, wherein one end of the force receiving member support is connected to the force receiving member and the other end of the force receiving member support is connected to the electric motor or suspension member, wherein the force receiving member support is sloped downward as it extends inward in the vehicle length direction from the force receiving member to the electric motor or suspension member, and wherein, when force directing inward in the vehicle length direction which is larger than the upper limit value acts on the force receiving member, the force receiving member is rotated about the other end of the force receiving member support inward in the vehicle length direction, whereby the force receiving member is moved upward.

4. The electric vehicle according to claim 3, wherein the force transmission mechanism is provided with a force transmitting member extending between the force receiving member and the bottom surface of the fuel cell stack at the outside in the vehicle length direction, wherein the force transmitting member is sloped upward as it extends inward in the vehicle length direction from the force receiving member to the fuel cell stack, and wherein, when the force receiving member is moved upward due to vehicle collision, upward force is transmitted through the force transmitting member to the bottom surface of the fuel cell stack at the outside in the vehicle length direction.

5. The electric vehicle according to claim 3, wherein, when the force receiving member is moved upward due to vehicle collision, the force receiving member abuts against the bottom surface of the fuel cell stack at the outside in the vehicle length direction, whereby the upward force is transmitted to the fuel cell stack.

6. The electric vehicle according to claim 1, wherein the force receiving member is comprised of an auxiliary of the electric vehicle.

7. The electric vehicle according to claim 6, wherein the auxiliary is comprised of at least one of a compressor for supplying air to the fuel cell stack, a cooling water pump supplying cooling water to the fuel cell stack, and a compressor for pumping coolant of an air conditioner of the vehicle.

8. The electric vehicle according to claim 3, wherein the force receiving member is comprised of the one end of the force receiving member support.

9. The electric vehicle according to claim 2, wherein a rib shaped portion is formed at the bottom surface of the fuel cell stack at the outside in the vehicle length direction against which the force receiving member abuts.

10. The electric vehicle according to claim 4, wherein the force receiving member is comprised of the one end of the force receiving member support.

11. The electric vehicle according to claim 5, wherein a rib shaped portion is formed at the bottom surface of the fuel cell stack at the outside in the vehicle length direction against which the force receiving member abuts.

* * * * *